United States Patent
Brock et al.

(10) Patent No.: US 6,935,587 B2
(45) Date of Patent: Aug. 30, 2005

(54) MOBILE ROCK CRUSHING PLANT

(75) Inventors: James Donald Brock, Eugene, OR (US); Gary P. Heeszel, Eugene, OR (US); Jeremiah West, Eugene, OR (US); Lawrence Calvin Olsen, Springfield, OR (US); Robert W. Carnes, Eugene, OR (US)

(73) Assignee: Johnson Crushers International, Eugene, OR (US)

( * ) Notice: Subject to any disclaimer, the term of this patent is extended or adjusted under 35 U.S.C. 154(b) by 146 days.

(21) Appl. No.: 10/165,677

(22) Filed: Jun. 6, 2002

(65) Prior Publication Data

US 2003/0226919 A1 Dec. 11, 2003

(51) Int. Cl.[7] ............................................. B02C 21/02
(52) U.S. Cl. ................................................ 241/101.76
(58) Field of Search ........................ 241/101.71–101.78

(56) References Cited

U.S. PATENT DOCUMENTS

| | | | | |
|---|---|---|---|---|
| 4,524,916 A | * | 6/1985 | Keyes et al. ........... | 241/101.76 |
| 5,025,992 A | * | 6/1991 | Niebur ................... | 241/101.76 |
| 5,161,744 A | * | 11/1992 | Schoop et al. ......... | 241/101.74 |
| 5,251,832 A | * | 10/1993 | Hentschel .............. | 241/101.76 |
| 5,294,065 A | * | 3/1994 | Harms et al. .......... | 241/101.76 |
| 5,664,907 A | * | 9/1997 | Betsinger ................ | 404/90 |

* cited by examiner

*Primary Examiner*—Mark Rosenbaum
(74) *Attorney, Agent, or Firm*—Schwabe Williamson & Wyatt, P.C.

(57) ABSTRACT

A rock crushing plant including rock crushers, screens and conveyors. The assembly is modularized whereby major components and associated support structures are organized into movable modules that are independently movable from site to site over public roadways. The modules are equipped with appropriate support wheels for traveling and stabilizing jacks for stabilization of the modules at a rock crushing site. Modifications are made to certain of the components to satisfy road height and width restrictions, e.g., folding conveyors. Each module is preferably equipped with its own power plant.

12 Claims, 6 Drawing Sheets

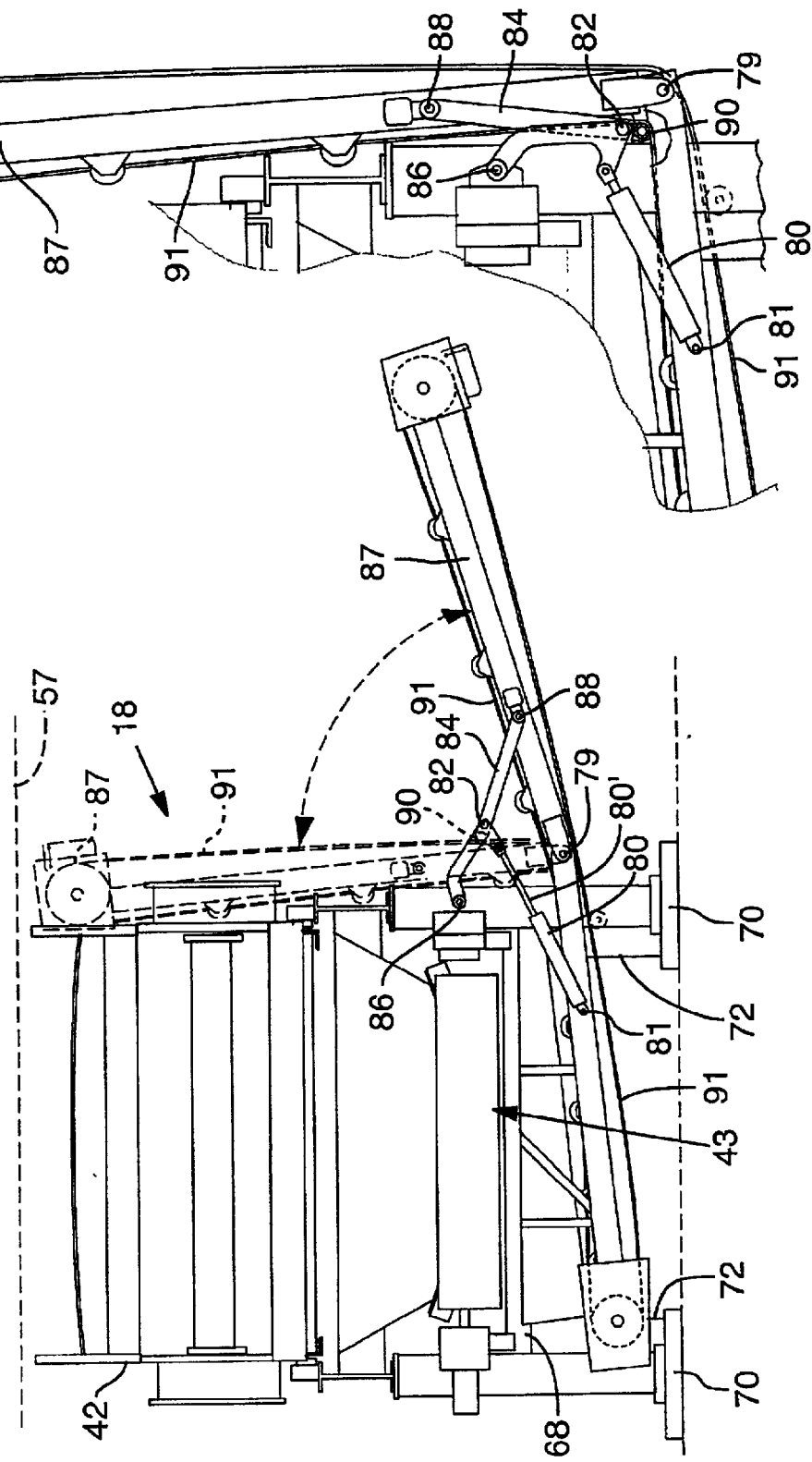

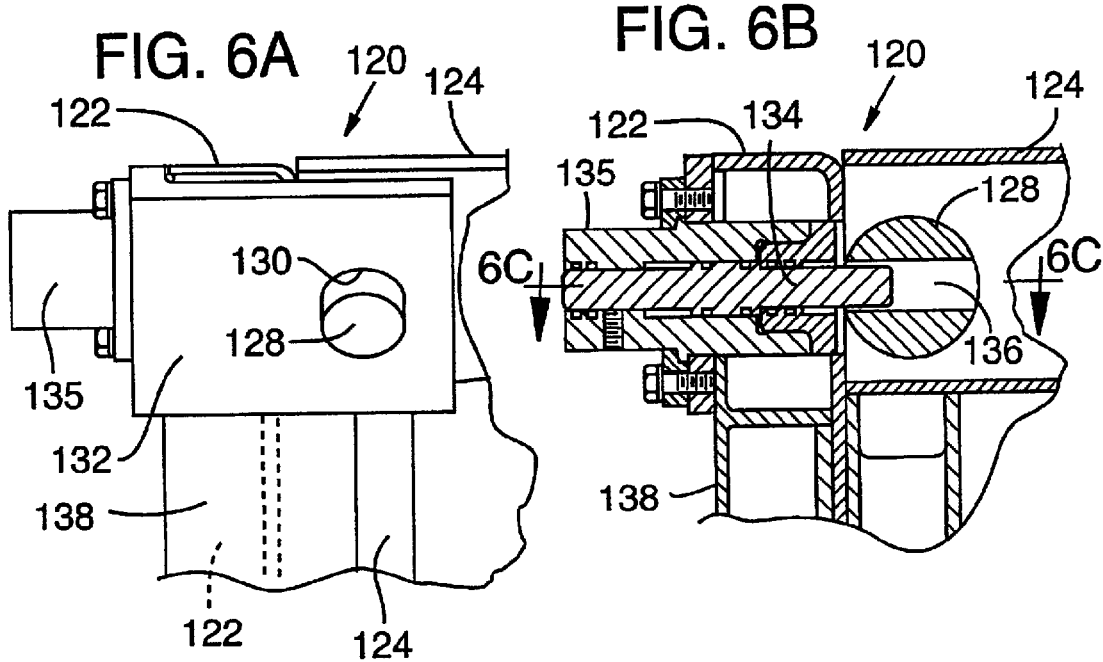
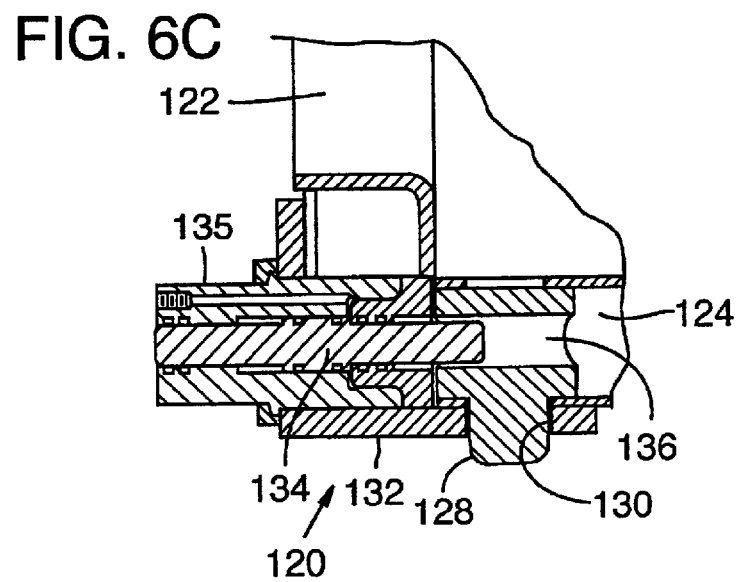

MOBILE ROCK CRUSHING PLANT

FIELD OF THE INVENTION

This invention relates to a rock crushing plant including numerous machines that cooperatively operate to crush, screen and convey rock materials, and more particularly it relates to a rock crushing plant design for efficient set up, break down and transportation of the machines for rendering the plant viably transportable as between different locations.

BACKGROUND OF THE INVENTION

Crushed rock has played and continues to play an integral role in road building and road maintenance. Traditionally, rock is extracted from rock quarries, located on selected property sites and transported to a nearby fixed-base rock crushing plant. Current rock crushing plants typically consist of multiple rock crushers that reduce oversized rock down to a desired size, multiple screens that separate the crushed rock according to size and multiple conveyors that transport the sorted material between the rock crushers and screens and then onto size designated stockpiles. Transfer of rock from the screens to the stockpiles can also be accomplished through the use of front end loaders, dump trucks and the like.

Prior art rock crushing facilities are typically set up near the rock extraction location such that great time, energy and manpower is required to properly position, secure and interconnect the plant components. The rock crushed by these plants is stockpiled and used to serve the needs of a regional area. Since crushed rock is hauled from the fixed base rock crushing plant to the point of use, the service area is limited to a certain radius by economics and efficiency reasons. As a result, multiple rock quarries and rock crushing plants are selectively spaced apart so as to enable the plants to supply crushed rock to distinct regional areas.

This practice requires equipping and manning multiple fixed rock crushing plants, which in itself is expensive and inefficient, but previously considered unavoidable. A single plant typically requires, e.g., three rock crushers, two screens, about a half dozen feed conveyors and similar number of stockpile conveyors. This equipment has to be organized into a desired pattern or arrangement to enable the rock materials to be sequenced through the equipment for processing. Given the number of processing stages, breaking down the entire operation presents an ominous task to an operator desiring to move the operation between job sites. To break down, move and bring back on line the current operating systems can take a number of days and many man-hours, the cost can be prohibitive and is considered viable only when moving from one permanent job site to another permanent job site.

Factors affecting the immobility of these crushing plants include the need to disassemble the various processing stages and to rearrange the equipment into small enough components such that when loaded onto trailers, they meet height, weight, width and length road restrictions. Any connection between the major processing components (e.g. feed conveyors and the like) need to be decoupled and moved separately.

Nevertheless, the preferred embodiment of the present invention resolves the inefficiencies and exorbitant costs associated with the current practice by converting a fully operable, permanently sited rock crushing plant as generally described above into a mobile rock crushing plant.

SUMMARY OF THE INVENTION

The preferred embodiment of the present invention provides a design for a rock crushing plant that modularizes the major components on individual self-contained mobile tractor-trailers. This embodiment was conceived by first noting that the major systems (i.e. screens and rock crushers) can be separated into distinct working units and compartmentalized such that they fit a single mobile trailer, despite the large size and heavy weight. This allows the components of the mobile rock crushing plant to be quickly moved into an area, easily set up, crush and stockpile enough rock to serve a region's demand, and quickly move to another location. At the new site, all that is required is that the relative location of the major components be pre-planned, the units moved into position based on that plan, and stabilizing jacks lowered into place. Conveyors are positioned to interconnect the major components and the plant is ready for operation. The entire breakdown and operational set up is achievable in a matter of a few hours as opposed to several days.

The mobility of the rock crushing plant of the preferred embodiment disclosed herein, therefore, maximizes the efficiency of a single plant, significantly reduces the cost and time associated with moving the fixed based plants, requires only a single operations crew, allows a broken or worn major component to be readily interchanged, and provides the user with the versatility of using fewer or additional screens or crushers that can be inserted or removed from the plant.

Again with reference to the preferred embodiment, to achieve modularization of the major components on mobile self-contained tractor-trailers, the crushers and screens had to be designed such that when mounted, the trailer stayed within the weight, height and length restrictions imposed by the Departments of Transportation. To solve the weight problem, each component of the preferred embodiment of the present invention utilizes multi-axle trailers sufficient to distribute the increased weight associated with incorporating the component's necessary operating elements onto a single trailer. To solve the length problem, the preferred embodiment of the present invention uses steerable trailer wheels, thus allowing the longer trailer to be turned without excessive damage to the roads.

To solve the height problem, modifications were made to two pieces of equipment. In the operational configuration, the surge bin, which feeds the cone crushers, exceeds road height requirements. The preferred embodiment contemplates using surge bins with hydraulically collapsible sides that when collapsed brings the overall trailer height within the legal limits. To maintain the necessary rigidity to resist the extreme outward forces endured when in operation, a channel locking mechanism connects the sides of the surge bin while in the upright position.

The second aspect of the cone crushing trailer that constricts mobility due to height and width are the conveyors that move the rock from one component to another component or to a stockpile conveyor. Folding conveyors allow the conveyor to meet the road restrictions. Prior folding conveyors, when folded, would allow the conveyor belt to slacken requiring that the belt be handled and chained up to keep it from dragging on the ground during transport. The preferred embodiment of the invention utilizes a mechanism that prevents the conveyor belt from slackening as it is folded on the trailer, which in turn prevents unnecessary wear and tear on the conveyor belt as the self contained unit is transported.

The use of foldable cross conveyors mounted onto the units replaces heretofore individual conveyors typically supported on the ground and extended from under the unit to, e.g., a stockpile conveyor. Conveyors that are laid on the ground with a receiving end, e.g., under a screen, will transport the material along the ground to a stockpile conveyor. The stockpile conveyor has to have a receiving end below the discharge end of the cross conveyor. To achieve passing off of the material to the stockpile conveyor, a hole is dug at the discharge end of the cross conveyor to enable placement of the receiving end of the stockpile conveyor below the discharge end of the cross conveyor. The cross conveyor of the present invention, being mounted substantially above the position of a ground supported conveyor, i.e., on the frame of the unit, enables the discharge end to be positioned at an elevation that allows the receiving end of the stockpile conveyor to simply rest on the ground. This is a further reduction in break down and set up time for the plant.

Finally, to ensure full independent mobility of each component, a dedicated power source is integrated onto each trailer having a major component of the system. The mobility and makeup of the preferred embodiment of the present invention's mobile rock crushing plant will be more fully understood upon reference to the following detailed description having reference to the accompanying drawings.

Whereas the invention herein is directed to production of aggregate for roadbed application and typically is produced by the initial extraction of rock from rock quarries to be crushed into aggregate size, e.g., for roadbeds, it also has application for recycling of concrete. That is, when a concrete structure is taken down, the concrete can be recycled into aggregate, e.g., for roadbeds or for other structural building needs. The large chunks of concrete, like large rock in a quarry, can be crushed, screened and separated by size in the same manner as rock. The mobile plant would thus be moved between destruction sites for processing of such recyclable concrete. Accordingly, such recycling of concrete is encompassed herein even though the discussion hereafter is directed to the crushing of rock as removed from a rock quarry.

BRIEF DESCRIPTION OF THE DRAWINGS

FIG. 3 is a rear view of the mobile screen unit illustrating the laterally protruding foldable cross conveyors.

FIG. 3A is an expanded view of the folding cross conveyor of FIG. 3 depicting the conveyor belt tensioning mechanism.

FIGS. 6A–6C are various views of the locking mechanism that prevents the surge bin walls from failing while in operation and that enables folding of the walls for transport of the rock crusher.

DETAILED DESCRIPTION OF THE DRAWINGS

Figure 1:
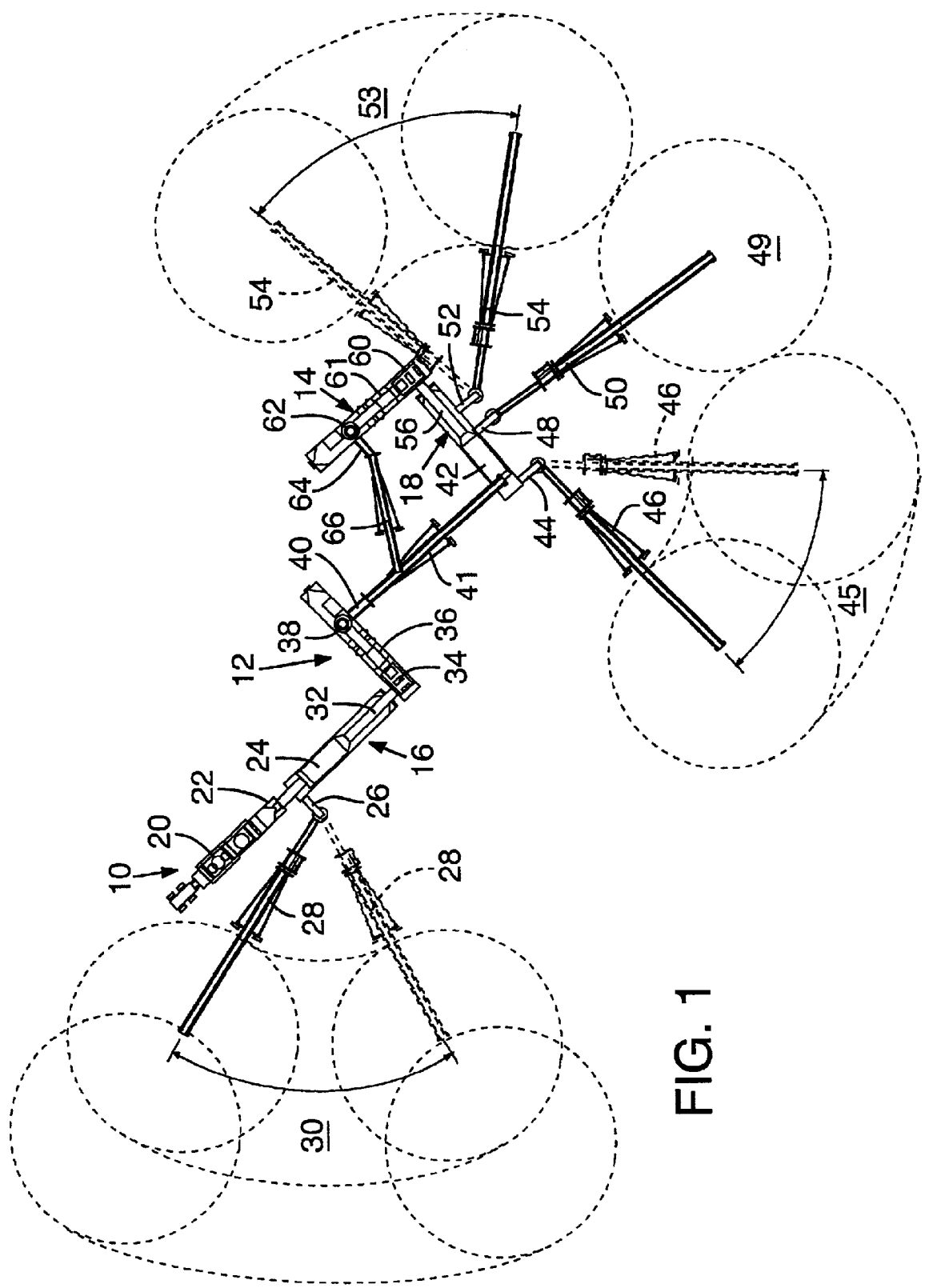
FIG. 1 is a top view of a standard layout for a mobile rock crushing plant in accordance with the preferred embodiment of the present invention, depicting the mobile rock crushers, mobile screen units and material distribution conveyors.

FIG. 1 is an overhead view of a mobile rock crushing plant that encompasses one arrangement of the major rock crushing components and conveyors. The illustrated embodiment of the mobile rock crushing plant consists of five individual mobile components including 1) a mobile jaw crushing unit 10 that reduces unprocessed larger rocks to rocks into a desired size range; 2) two mobile cone crushing units 12 and 14 that further reduces the rocks to various smaller sizes, usually to a size of approximately three-quarters of an inch or less; and 3) two mobile screen units 16 and 18 that separate the crushed rock based on size. One skilled in the art would appreciate that the arrangement of the illustrated embodiment is one of many configurations for a mobile rock crushing plant, and that fewer or more screen units or crushing units could be employed.

From the beginning of the process of the illustrated embodiment, rock of varying sizes is extracted from a quarry and transported to the mobile jaw crushing unit 10. A jaw crusher 20 of the mobile jaw crushing plant 10 crushes the mined rock into sizes less than a certain size and deposits the rock onto an outfeed conveyor 22. In the preferred embodiment of the invention, the jaw crusher 20 reduces the mined material to less than 6 inches in size. The outfeed conveyor 22, which is an integrated piece of the mobile jaw crushing plant 10, moves the crushed rock from the jaw crusher 20 to the first mobile screen unit 16.

The first mobile screen unit 16 contains a multi tiered screen 24 that separates the rock fed from the jaw crusher trailer based on size. The multi tiered screen 24 segregates rock of less than a certain diameter, also referred to as "fines" (e.g. less than one half of an inch in diameter) and deposits the fines onto dual interim conveyors located below the multi tiered screen 24, which moves the screened material to the cross conveyor 26. These conveyors can be reversible such that they can move material collected from the screen towards either the front or the rear of the mobile screening unit. The cross conveyor 26 extends laterally outward during operation or generally perpendicular to the side of the mobile screen unit 16. The cross conveyor 26 moves the screened rock to a detached telescoping stockpile conveyor 28 that deposits the fines into storage pile 30. The remaining larger rock not screened as fines is deposited onto the screen outfeed conveyor 32 and conveyed to the primary cone crushing unit 12. The multi tiered screen 24, dual reversible interim conveyors, cross conveyor 26 and screen outfeed conveyor 32 are integrated components of the overall mobile screen unit 16.

The secondary crushing unit 12, or cone crushing unit as show in the illustrated embodiment, receives the separated rock from the first screen outfeed conveyor 32 in a surge bin 34. The surge bin 34 variably controls the amount of feed material that is fed to the cone crusher 38 through the use of a vibrating feeder. To assure that the cone crusher does not run out of material, sonic detectors may be utilized to detect impending depletion levels of material (rock) in the crusher with the feed conveyor made responsive to the detectors to thereby initiate a speed up of the material feed. The surge bin accordingly deposits a steady stream of rock onto the cone crusher feed conveyor 36, which transports the rock to the top of the cone crusher 38 in sufficient quantity to avoid depletion. The cone crusher 38 crushes the rocks to a maximum size range, which in the one embodiment is approximately one inch to and inch and one-half in diameter. The crushed rock exits the bottom of the cone crusher 38 and is deposited onto the cone crusher cross conveyor 40. The cone crusher cross conveyor 40 deposits the crushed rock onto a first transport conveyor 41, which transports the crushed rock to the second mobile screen unit 18. The surge bin 34, cone crusher feed conveyor 36, cone crusher 38, and the cone crusher cross conveyor 40 are all integrated components of the mobile crushing unit 12.

The second mobile screen unit 18, like the first, also contains a multi tiered screen 42 that separates the crushed rock by size. In the illustrated embodiment, the second mobile screen unit 18 is set up to separate the crushed rock into four different sizes: <¼"; ¼"–⅜"; ⅜"–⅝"; and >⅝". As one skilled in the art would recognize, the size of the screened rock can be controlled by using different diameter screens in the decks of the multi tiered screen 42. From the multi-tiered screen 42, the <¼" sized rock is deposited on a reversible interim conveyor (shown and discussed with regard to FIGS. 2, 2A, and 3 below) located below and running substantially the length of the multi-tiered screen 42, and transported to the ¼" cross conveyor 44, which extends laterally outward or generally perpendicular to the mobile screen unit 18 during operation. The ¼" cross conveyor 44 transports and deposits the material on to a second telescoping stockpile conveyor 46 that stockpiles the material at 45. The ¼"–⅜" sized rock is deposited from the end of the screen 42 directly onto the ⅜" cross conveyor 48, which transports and deposits the material on a fourth telescoping stockpile conveyor 50 that stockpiles the material at 49. The even larger ⅜"–⅝" sized rock is deposited onto another reversible interim conveyor (shown and discussed with regard to FIGS. 2, 2A, and 3 below) that conveys the rock forward to the ⅝" cross conveyor 52. The ⅝" cross conveyor transports and deposits the separated material on a fifth telescoping stockpile conveyor 54 that stockpiles the material at 53. Any material larger than ⅝" (unscreened material) moves from the multi-tiered screen 42 to a second screen outfeed conveyor 56. The second screen outfeed conveyor 56 transports the rock to the surge bin 60 of a tertiary mobile crushing unit 14, which in the illustrated embodiment is also a cone crushing unit. In the preferred embodiment, as with the first mobile screen unit 16, the multi tiered screen 42, dual reversible interim conveyors, cross conveyors 44, 48 and 52, and the secondary screen outfeed conveyor 56 are integrated components of the overall mobile screen unit 18.

The tertiary mobile crushing unit 14, also a cone crusher in the illustrated embodiment, is substantially the same as the secondary crushing unit 12. The feed from the mobile screen unit outfeed conveyor 56 is received in surge bin 60, controllably deposited onto the cone crusher feed conveyor 61, which in turn feeds the cone crusher 62 where the rock is again crushed. The crushed rock exits the bottom of the tertiary crusher 62 and is deposited on a second cone crusher cross conveyor 64. The second cone crusher cross conveyor 64 transports and deposits the material on a second transport conveyor 66, which redeposits the material on the first transport conveyor 41. From here the crushed rock is rescreened in the second mobile screen unit 18. In the illustrated embodiment, as with the secondary crushing unit 12, the surge bin 60, cone crusher feed conveyor 61, cone crusher 62, and the cone crusher cross conveyor 64 are integrated components of the mobile crushing unit 14.

Figure 2:
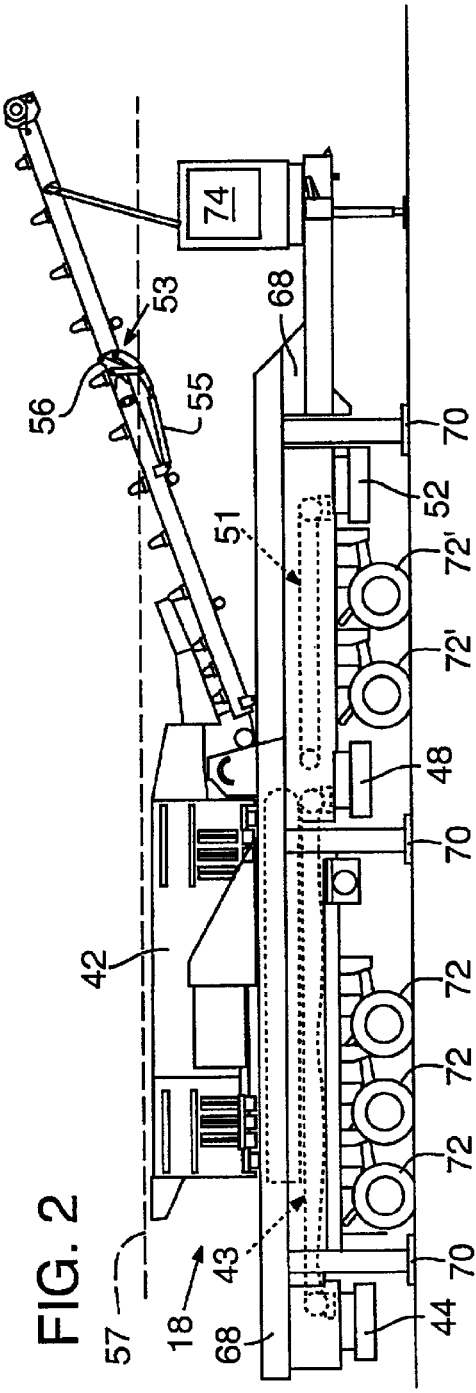
FIG. 2 is a side view of a mobile screen unit in its operational configuration.

FIG. 2 shows an expanded side view of the independent and fully mobile screen unit 18 in its operational configuration. It is understood that mobile screen unit 16 is substantially the same as mobile screen unit 18, except mobile screen unit 16 has fewer cross conveyors and reversible interim conveyors. In describing components that enable mobility of the mobile screen unit 18, the same description applies to mobile screen unit 16.

Figure 2A:
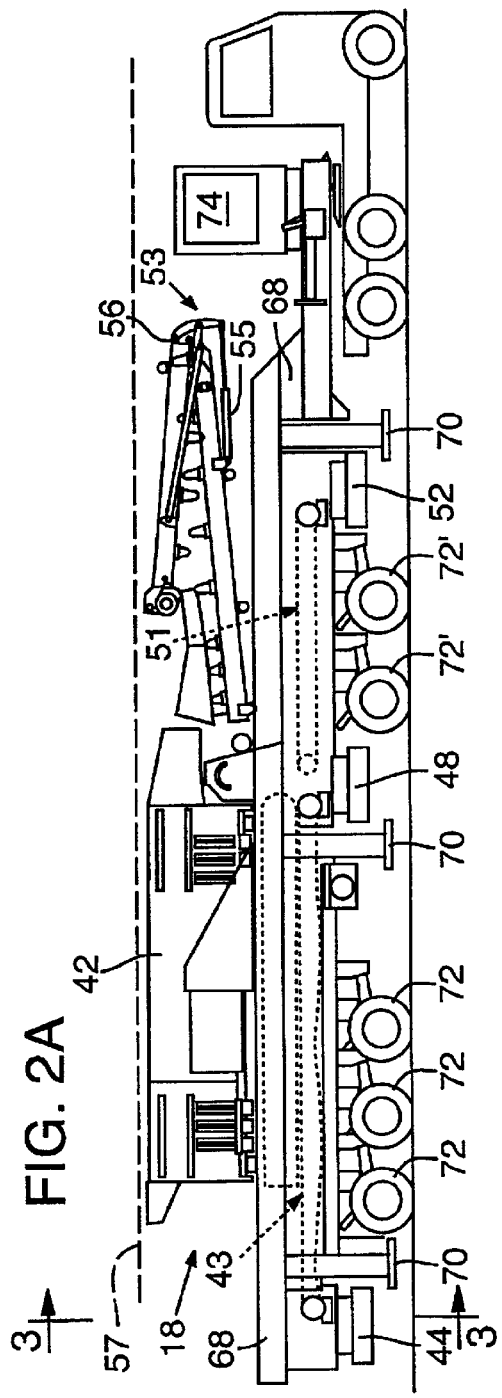
FIG. 2A is a side view of the mobile screen unit of FIG. 2 in its travel configuration.

Mobility of the screen units is achieved by keeping the height, weight, length and width of the trailer within the state and federally imposed road restrictions. The multitiered screen 42 is mounted on a screen transport trailer 68. The screen transport trailer is fit with multiple downward extending jacks 70 that stabilize and level the trailer when it is moved into the position determined by the site plan. The jacks 70 are independent and can be selectively extended to account for varying terrain. As shown in FIG. 2A, to allow the mobile screen unit to move from its predetermined location to another selected location, the stabilizing jacks 70 are retracted to the point that the weight of the screen transport trailer 68 and other components of the mobile screen unit is no longer distributed on the stabilizing jacks 70.

As shown in FIGS. 2 and 2A, the screen transport trailer 68 employs multiple axle and wheel combinations 72 and 72' that distribute the mobile screen unit's immense weight when it is in the mobile configuration and is transported on the roads. In the illustrated embodiment, the forward axle and wheel combinations 72' are steerable to allow the trailer to meet certain road length restrictions. The steerable axle and wheel combinations 72' also allow the mobile screen unit to be readily maneuvered into place. However, one skilled in the art would appreciate that the axles 72' do not have to be steerable, as the size and length of the trailer in its overall configuration dictates whether the axles need to be steerable. To further enhance the mobile screen unit's mobility, a power generation unit 74 is fixed on the screen transport trailer 68. The power generation unit 74 supplies the necessary power to operate the multi tiered screen 42, reversible interim conveyors 43 and 51, cross conveyors 44, 48 and 52, and the screen outfeed conveyor 56.

As further shown in FIG. 2 by height restriction plane 57, in its operational configuration, the height of the mobile screen unit 18 exceeds the road height restriction of approximately 14 feet. As shown in FIG. 2A, to allow the mobile screen unit to be moved via the public road system, the screen outfeed conveyor 56 of the preferred embodiment is hinged at 53 such that it can fold back on itself. Also, the screen outfeed conveyor can be raised and lowered to allow the folded outfeed conveyor 56 to fit within the height restriction plane 57, as shown in FIG. 2A. In the illustrated embodiment, hydraulic cylinders 55, when actuated, cause the upper portion of the screen outfeed conveyor to fold back on itself to enable the mobile screen unit 18 to fit under the height road restrictions and to be hauled on the roads.

Referring back to the mobile screen unit 18 depicted in FIG. 1, when in the operational configuration the cross conveyors 44, 48 and 52 extend laterally out the side of the screen unit so that they can transport the screened material to the respective telescoping stockpile conveyors 46, 50, and 54. To move the mobile screen unit 18 to a new location, the outer portions of the cross conveyors raise to a generally vertical position. As depicted in FIG. 3, the cross conveyors are hinged at hinge 79 to allow them to be folded upward in substantially a vertical position.

As seen in FIG. 3, to raise the portion of the conveyor that protrudes from the side of the transport trailer 68, the preferred embodiment uses hydraulic cylinders 80 that are mounted to both sides of the cross conveyor (only one side shown in FIGS. 3 and 3A) which is fixed under the transport trailer 68, at point 81. The actuating arm of each hydraulic cylinder 80 is attached to the pivot joint 82 of a connecting brace 84. The jointed connecting brace 84 connects the protruding portion 87 of the cross conveyor 44, 48, 52 to the side of the transport trailer at 86 at a point higher in relation to the pivot joint 82. The other end of the jointed connecting brace 84 is attached to the outer section 87 of the folding conveyor at point 88. When the cylinder 80 is actuated, actuator arm 80' pulls inward and downward on pivot joint 82, which causes the outer section 87 of the cross conveyor to rise to the generally vertical transport position (as depicted in FIG. 3A and in FIG. 3 by dashed lines) such that the height of the vertical conveyor portion 87 does not exceed height restriction plane 57.

When raising the cross conveyors 44, 48 and 52 to the transport position, the conveyor belt 91 tends to slacken and slip over the end of the conveyor such that it will drag on the ground when in transport. To prevent the conveyor belt slackening and dragging on the ground when folded in the upright position, a belt tensioner is used that keeps tension on the belt as the conveyor is raised. In the preferred embodiment, and as shown in FIG. 3A, a cross member 90 is attached between the connecting braces 84 (at each side of the conveyor) and positioned such that as the conveyor folds and the belt begins to rise up due to slippage over the conveyor end, the cross member 90 contacts the conveyor belt 91. As the conveyor continues to rise, the cross member keeps tension on the belt and prevents slackening by holding the belt close to the conveyor pivot point 79. Thus when the cross conveyor is raised to the vertical position, the belt remains tensioned around the entire length of the conveyor so when the mobile screen unit 18 is moved, the belt will not drag on the ground.

Figure 4:
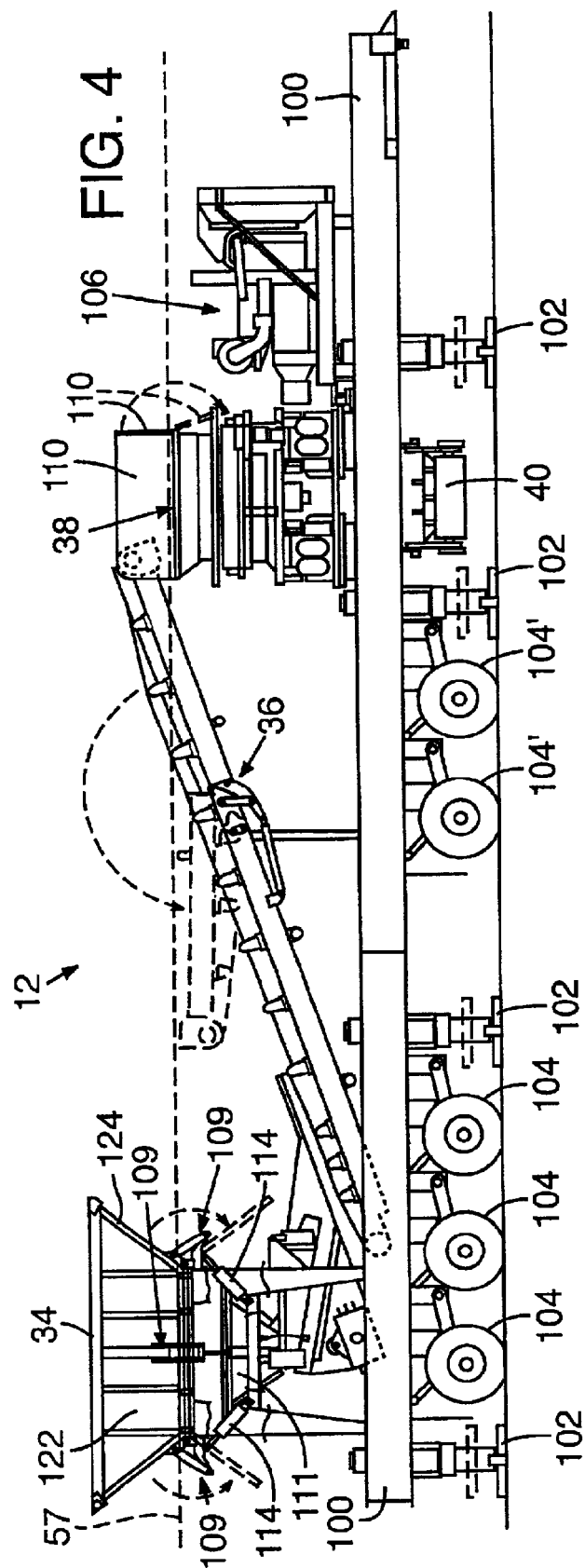
FIG. 4 is a sectional view of the mobile cone crusher unit illustrating the surge bin with the foldable sides in the operational position and dashed lines illustrating the transportable position.

FIG. 4 depicts mobile cone crushing unit 12. It is to be understood that in the preferred embodiment of the present invention, the mobile cone crushing unit 14 is the same as mobile cone crushing unit 12 and its features will not be separately discussed. In order to achieve complete modularization of a major component and allow full mobility, the mobile cone crushing unit 12 utilizes several of the same features as the mobile screen units 16 and 18, discussed above. The preferred embodiment of the mobile cone crushing unit 12 also consists of a mounting trailer 100, multiple stabilizing and leveling jacks 102, multiple axle and wheel combinations 104 and 104' to distribute weight, steerable axle and wheel combinations 104' that compensate for trailer length, and a self contained power generation unit 106 that operates the surge bin 34, cone crusher feed conveyor 36, cone crusher 38, and the cone crusher cross conveyor 40.

The preferred embodiment of the cone crusher feed conveyor 36 is hinged in the same manner as the outfeed conveyor 56 for the mobile screen unit 18, which is shown in FIGS. 2 and 2A and discussed above. As further shown in FIG. 4, to put the mobile cone crushing unit into transport configuration, the cone crusher feed conveyor 36 folds back on itself such that it falls below the height restriction plane 57. The cone crusher cross conveyor 40 is also hinged such that the protruding portion rises to the vertical position in the same manner as the mobile screen unit cross conveyors as depicted in FIG. 3. Folding the cone crusher cross conveyor to the vertical position enables the mobile cone crushing unit to be transported on public roads. The same conveyor tensioning mechanism 90 is used to prevent slackening of the conveyor belt when it is folded vertically as that used for the mobile screen unit 18 cross conveyor shown in FIG. 3A.

The mobile cone crushing unit 12 further consists of a cone crusher 38 that reduces rock to the desired size and deposits it onto the cross conveyor 40. To meet road height requirements, the cone crusher receiving chamber has hinged walls 110 that allow the sides to fold over for transport. The variable feed surge bin 34 receives rock from a mobile screen unit 16 or 18 (as shown and discussed in regards to FIG. 1) and feeds a steady stream of material to the cone crusher feed conveyor 36, which in turn conveys the material to the cone crusher 38 for processing. Because the amount of rock that needs further crushing after passing through a mobile screen unit is variable, the surge bin 34 has higher sides that allows sufficient quantities of rock to be amassed. This allows the surge bin 34 to provide the controlled constant feed of material to the cone crusher 38, which ensures reliable and efficient operation.

As shown in FIG. 4, the high sides of the surge bin 34 also cause the mobile cone crusher unit 12 to exceed the road height requirements depicted by height restriction plane 57 while in the operational position. As to enable mobility of the mobile cone crushing unit 12, the side walls 122 and end walls 124 of the surge bin 34 are hinged at hinge 109 such that when disconnected from each other they can fold down. As further shown in FIGS. 5 and 5A, the preferred embodiment of the folding surge bin 34 consists of a hydraulic cylinder 114 connected to a hinge linkage 112, which connects the folding portion of end walls 124 and side walls 122 to the respective non-folding portion of the surge bin walls 111. To move the wall from the folded position to the operational position, the hydraulic cylinder 114 moves outward and upward controllably pushing the wall into position. In the preferred embodiment, each of the surge bin side walls 122 and end walls 124 possess a hydraulic cylinder 114 pivotally attached to both the hinge linkage 112 and the respective non-folding portion of the surge bin wall 111.

When in operation, a substantial amount of rock can collect in the surge bin 34. This exerts tremendous outward forces on the folding surge bin walls 111. To enable the folding surge bin walls 122, 124 to withstand these outward forces, the end walls 124 are securely attached to the sidewalls 122 at each corner 120 and supported along much of the length of the wall to a point above hinge point 109. This connection cannot be permanent, e.g. in the form of a weld, otherwise it could not be readily disconnected to prepare the cone crushing unit 12 for moving and reconnected when in its new location. Yet, the connection must be strong enough such that the surge bin walls can withstand the extreme outward forces encountered as the surge bin 34 fills with rock.

Figure 5:
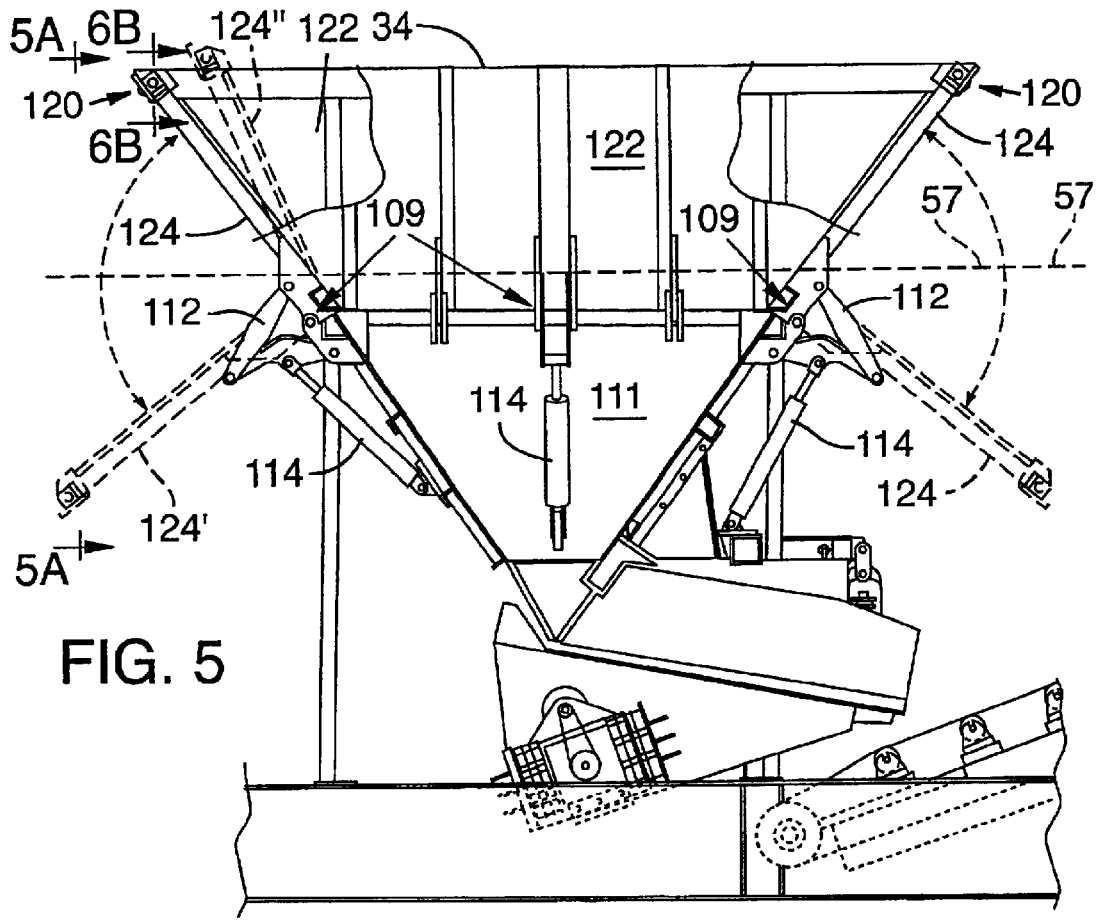
FIG. 5 is an enlarged side view of the surge bin of FIG. 4.
Figure 5A:
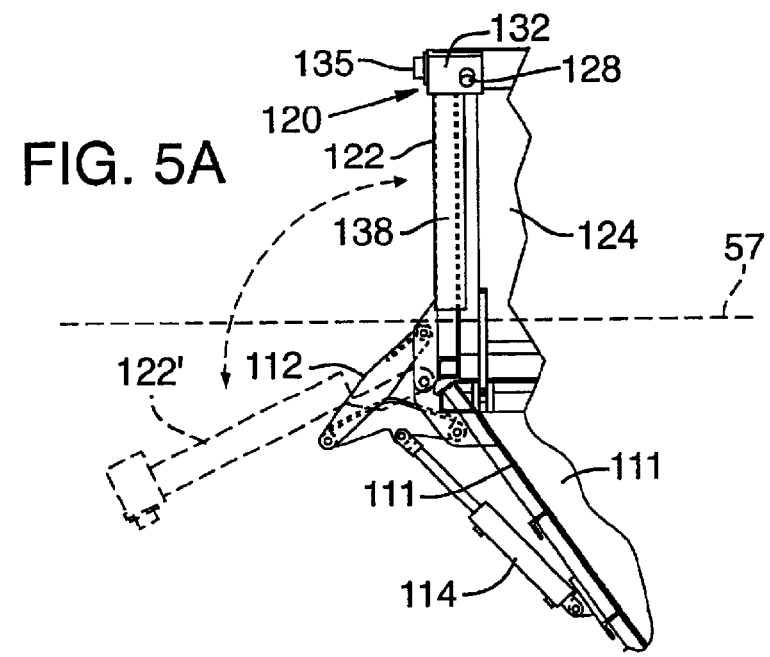
FIG. 5A is an enlarged view of the surge bin wall folding mechanism.

FIG. 5A is a view taken on view lines 5A—5A as indicated in FIG. 5, FIG. 6A is an enlargement of the upper corner of FIG. 5A and FIG. 6B is a view taken on view lines 6B—6B of FIG. 5. FIG. 6C is a view taken on view lines 6C—6C of FIG. 6B. In combination these views illustrate the releasable connection mechanism between side walls 122 and end walls 124 that enables the surge bin 34 to withstand the operational forces. To convert the walls 122, 124 from their travel configuration to their operational configuration, the end walls 124 are first raised from their lowered position at 124' to a position past their operational configuration as indicated at 124" in FIG. 5. The side walls 122 are then raised from the travel position 122' to a generally vertical position as seen in FIG. 5A. The end walls 124 are then lowered to the operational position. When lowered, a pin 128, attached to each upper corner of end walls 124, extends through a similarly sized hole 130 in L-bracket 132, which is attached to the side wall 122. (See FIGS. 5A and 6A) Once the end wall 124 is resting against L-bracket 132 attached to side wall 122 and the pin 128 engages the hole 130, in the preferred embodiment, a latch bolt 134 contained in housing 135 on wall 124 is actuated so as to extend the latch bolt 134 into an accommodating slot 136 in the pin 128. (See section views 6B and 6C.) In the preferred embodiment of the present invention, the latch bolt 134 is hydraulically actuated. One skilled in the art, however, would appreciate that a number of different bolt or pin-type latches could be used, which could be either manually, electronically or hydraulically inserted in accommodating slot 136.

As shown in FIGS. 5A and 6A, the preferred embodiment includes channel 138 that is fastened to the outside edge of the sidewalls 122 and extends from the L-bracket 132 to the a point above hinge 109 of the sidewalls 122 and end walls 124. The channel 138 extends beyond the inside edge of side walls 122, such that when in the operational configuration, the end walls 124 rest against the portion of the channel 138 that extends beyond the inside edge of the sidewalls 122.

To prepare the surge bin 34 for transportation, the latch bolt 134 is retracted from the slot 136. The end wall 124 is then pivoted upwardly enough to allow the pin 128 to clear hole 130. The side walls 122 are then lowered below the height restriction plane 57 (shown as 122' in FIG. 5A). With the side walls 122 clear, the end walls 124 are then lowered to a point below the height restriction plane 57 (shown as 124' in FIG. 5).

Numerous variations will become apparent to those skilled in the art without departing from the invention that is defined by the accompanying claims.

The invention claimed is:

1. A mobile rock or concrete crushing plant comprising:
   multiple units including at least a rock or concrete crushing unit and a screen unit;
   said multiple units each mounted on a movable base and each having an independent power source;
   said multiple units having a determined arrangement at a selected site for cooperatively processing rock or concrete material;
   said multiple units positioned at said site to accommodate said arrangement and each of said units including releasable stabilizing mechanisms for selectively stabilizing said units at said positions and for rendering said units immobile;
   said multiple units each designed for being transported over public roadways for transporting said units making up the rock or concrete crushing plant to a second sites, each unit of said multiple units including a non-steerable axle assembly positioned near a rear portion of the unit, and a steerable axle assembly positioned toward a forward portion of the unit.

2. A mobile rock or concrete crushing plant as defined in claim 1 including conveyors that move said rock or concrete material to and from said screen unit and said rock or concrete crushing unit for further processing or distribution.

3. A mobile rock or concrete crushing plant as defined in claim 1 wherein said screen unit comprises a plurality of vertically stacked screen decks for selectively separating said rock or concrete material into screened material of various sizes and unscreened material;
   a plurality of conveyors; said conveyors including at least one outfeed conveyor that moves said unscreened material to a rock or concrete crushing unit, at least one interim conveyor that moves said screened material to a cross conveyor, said cross conveyor moving said screened material laterally away from said mobile screen unit for further distribution.

4. A mobile rock or concrete crushing plant as defined in claim 3 wherein said cross conveyors include a fixed portion substantially contained within the width of the screen unit and an extended portion, said extended portion hingedly connected to said fixed portion to enable folding thereof from a substantially laterally extended position to a substantially vertical position such that said screen unit fits within the road height and width restrictions.

5. A mobile rock or concrete crushing plant as defined in claim 3 wherein said out feed conveyor includes a bottom portion and an upper portion hingedly connected to said bottom portion to enable folding of the upper portion back onto itself such that said mobile screen unit fits within the road height restrictions such that said mobile screen unit fits within the road height restrictions.

6. A mobile rock or concrete crushing plant as defined in claim 1, wherein said mobile crushing unit comprises:
   a rock or concrete crusher for reducing said rock or concrete material size;
   a surge bin for receiving said rock or concrete material to be crushed and feeding said material to said rock or concrete crusher, the surge bin being horrizontally spaced apart from the rock or concreted crusher;
   a plurality of conveyors, said conveyors including at least one inclined crusher feed conveyor that controllably transports said material from said surge bin to said rock or concrete crusher, and at least one cross conveyor that receives crushed material from the bottom of said rock or concrete crusher and transports said crushed material for further processing.

7. The mobile rock or concrete crushing unit of claim 6, wherein said surge bin has foldable upper wall portions that when extended in an operational configuration each upper wall portion is interconnected with an adjacent upper wall portion, and when folded in a travel configuration allows said mobile crushing unit to fit within said road height restrictions.

8. The mobile crushing unit of claim 6, where said cross conveyor includes a fixed portion and an extended portion hingedly connected to said fixed portion and folds from a generally laterally extended position to a generally vertical position such that said mobile rock or concrete crushing unit fits within said road height and width restrictions.

9. The mobile rock or concrete crushing unit of claim 6, where said rock or concrete crusher feed conveyor is jointed such that it can fold back on itself to enable said mobile screen unit to fit within said road height restrictions.

10. A mobile material processing plant comprising:
    at least one mobil rock crushing unit having a forward end and a rearward end, the at least one mobile rock crushing unit including a trailer having a non-steerable axle assembly at a location near the rearward end and a steerable axle assembly positioned between the non-steerable axle assembly and the forward end, a surge bin mounted toward a first end of the trailer, a rock crusher horizontally spaced apart from the surge bin and mounted towards a second end of the trailer, and a controllable incline feed conveyor configured to convey material from a metering feeder positioned at a lower portion of the surge bin to an upper portion of the rock crusher;
    at least one mobile screening unit having a forward end and a rearward end, the at least one mobile screening unit including a trailer having a non-steerable axle assembly at a location near the rearward end and a steerable axle assembly positioned between the non-steerable axle assembly and the forward end, the mobile screening unit including a plurality of conveyors including at least one out feed conveyer and at least one foldable cross conveyor; and
    the at least one rock crushing unit and the at least one screening unit each including an independent power source and a releasable stabilizing mechanism for selectively stabilizing the units during operation and for rendering the units mobile for transport to a new site.

11. The mobile material processing plant of claim 10, wherein the first end is the rearward end of the mobile rock crushing unit and the second end is the forward end of the mobile rock crushing unit.

12. The mobile material processing plant of claim 10, wherein the at least one foldable cross conveyor includes a single endless belt, a fixed portion positioned substantially under the trailer and an extended portion hingedly connected to the fixed portion, the extended portion configured to fold from a substantially laterally extended position to a non laterally extended position such that the mobile screening unit may fit within certain road height and with restrictions.

* * * * *